April 14, 1959 A. EISENSCHINK 2,881,655
REAR VIEW MIRRORS

Filed May 31, 1955 2 Sheets-Sheet 1

INVENTOR
ANTON EISENSCHINK
BY: Richards & Geier
ATTORNEYS

April 14, 1959　　A. EISENSCHINK　　2,881,655
REAR VIEW MIRRORS
Filed May 31, 1955　　2 Sheets-Sheet 2
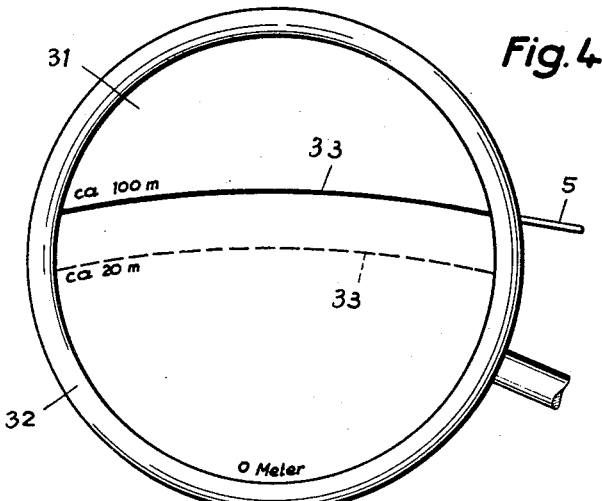
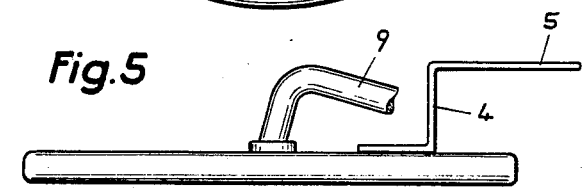
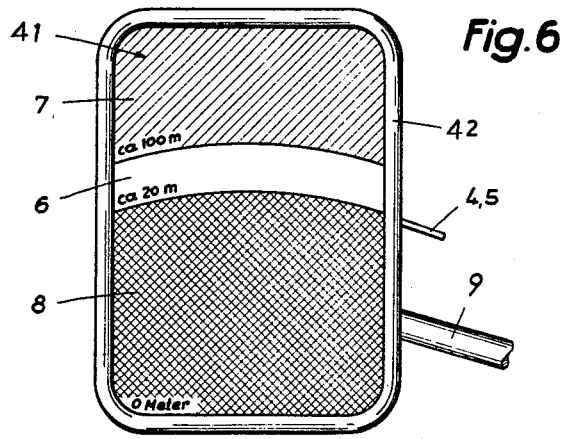
INVENTOR
ANTON EISENSCHINK
BY: *Richard & Geier*
ATTORNEYS United States Patent Office 2,881,655
Patented Apr. 14, 1959

2,881,655

REAR VIEW MIRRORS

Anton Eisenschink, Marzoll-Waisbach, Bad Reichenhall, West Germany

Application May 31, 1955, Serial No. 512,101

Claims priority, application Germany May 31, 1954

2 Claims. (Cl. 88—2.3)

This invention relates to a mirror for motor vehicles and refers more particularly to a mirror adapted to provide a view of traffic in the rear of a vehicle.

With the development of high speed vehicular traffic, particularly on motor speedways, the danger has arisen that the driver will underestimate his distance from the cars which follow him and which are visible in the rear view mirror. A large number of automobile accidents has been found to result from these circumstances.

Rear view mirrors known in prior art have the drawback that they do not take into consideration one of the important optic phenomena taking place while the mirror is being used, namely, the fact that although the outline of a car in the mirror changes with the change of the distance of that car from the viewer, namely it becomes larger with the approach of the car, the image of the approaching car moves from the top to the bottom of the mirror as the distance diminishes. Thus in order to use this prior art mirror for estimating the distance between two cars, the driver of the front car is obliged to change the angle at which he views the image at the moment when the rear car begins to overtake him if his estimate of the distance between the two cars is to be correct to any extent. Thus the attention of the driver is distracted from the driveway at a critical moment, so that a new source of accidents is created.

An object of the present invention is to provide a rear view mirror which is so constructed that the drawbacks of prior art constructions are substantially eliminated.

Other objects of the present invention will become apparent in the course of the following specification.

In accordance with the present invention the measuring of the estimation of the distance of the car following that of the viewer is not accomplished by the use of the changing size of the image, but by the use of the perpendicular distances traversed by the image from the upper edge of the mirror to its lower edge corresponding to the changing distances of the rear car.

According to the present invention, this is accomplished in that the mirror is provided with straight or curved lines, depending as to whether cylindrical or flat mirrors are used, said lines extending transversely through the entire width of the mirror at different vertical distances from each other and corresponding to an imaginary line connecting the points of contact of the front wheels of the overtaking car with the surface of the road at different distances from the image in the mirror.

Thus after the front wheels of the overtaking car appear in the mirror of the present invention and while this image moves from top to bottom of the mirror, the image will in some of its positions overlap with these lines with the result that the viewer will be able to determine the precise location of the overtaking car. Thus a driver using the mirror of the present invention can determine the distance of an overtaking car by a quick glance at the mirror without being distracted to any substantial extent from his task of watching the traffic which is ahead of him.

Obviously, the mirror of the present invention is operable only when the mirror along with its casing and its indicia is set for the actual distances and is immovably attached in the proper positions to the vehicle. This requirement can be easily complied with by simple constructional means.

However, the attachment of the mirror can also be so constructed that after the mirror has been properly adjusted and fixed, it will still remain adjustable solely about the vertical axis.

The lines constituting the indicia are preferably made of many colors and the line which designates the beginning of the danger zone, as well as another line which may extend from that line to the lower end of the mirror, may be made of striking colors which will readily attract the attention of the eye. In order to increase their effect and their visibility, the lines may be made in colors which luminesce at night.

The necessary adjustment of the rear view mirror of the present invention is made by taking into consideration the specific eye level of a driver, corresponding to the seat size and a specific seating position, as well as to the specific distance of the mirror to the road and to the specific distance between the eye of the observer and the mirror.

It is apparent that after the mirror has been set, the indicia showing the various distances may have to be changed due to the shifting of the driver's position, the use of the car by different drivers and different seating habits, as well as due to a change in the inclination of the mirror caused by a change in the inclination of the longitudinal axis of the car resulting from a variation of the load. In accordance with the present invention, an estimation of the location of the overtaking car may be made nevertheless with sufficient precision through the provision of a line indicator, viewing slit or the like, located upon the frame of the mirror at a distance from the rear surface thereof and extending parallel thereto, which projects beyond the edge of the mirror frame and constitutes a continuation of one of the indicating lines upon the mirror—preferably the line representing the dangerous distance—when viewed in the proper direction of sight perpendicularly to the surface of the mirror.

Due to this arrangement any small correction made necessary under the above circumstances, by a change in the position of the driver or a different inclination of his head etc., can be conveniently carried out by moving the indicator in alignment with the distance-indicating line to which it belongs, whereby the accuracy of the reading is restored. However, even if this adjustment is not made, after the driver has changed his position, for example, he will be able, after some practice, to estimate the correct distance by taking into consideration the extent of the visible difference in positions of the indicating line upon the mirror and the corresponding line indicator or viewing slit.

While using the mirror of the present invention it will be necessary for the viewer to observe at the same time indicating lines upon a mirror which may be located at a distance of 1 meter from the viewer and the image of an object located, for example, at a distance of 100 meters. The eye instinctively, due to its accommodation power, will have the tendency to adjust itself either to the distance of the mirror, or to the distance of the car image appearing in the mirror. Drivers with somewhat defective vision may not see some of these objects sufficiently clearly. In any event continuous variations in the visual accommodation may tire the eyes of the driver. To eliminate this, a modification of the mirror of the present invention provides that indicia upon the mirror which show the distance of the overtaking car be formed by, preferably, three strips extending between the indicating lines and having different reflecting power provided by different coloring, said strips extending transversely across the width of the mirror; preferably, that strip the lower edge of which coincides with the danger-indicating line remains colorless and has the greatest reflecting power, while the two strips above and below the first-mentioned strip have smaller as well as different reflecting powers, with the upper strip absorbing less light than the lower strip.

Consequently, this device effectively avoids the above described possible observation difficulties. Due to this construction of the mirror and of the distance indicator, the appearance of the overtaking car in the danger zone upon the mirror is made much more striking, so that the time period required to enable the driver by glancing at the mirror to judge the distance and realize the danger is considerably shortened, since the appearance of the image of the overtaking car upon the bright mirror strip can be determined by a quick side glance without absorbing the attention of the driver to any appreciable extent.

The invention will appear more clearly from the following detailed description when taking in connection with the accompanying drawings showing, by way of example, preferred embodiments of the inventive idea.

In the drawings:

Figure 4 is a plan view of a round mirror provided with a line indicator.

Figure 5 is a top view of the mirror shown in Figure 4.

Figure 6 is a plan view of a mirror provided with sections having different reflecting power.

Figure 1:
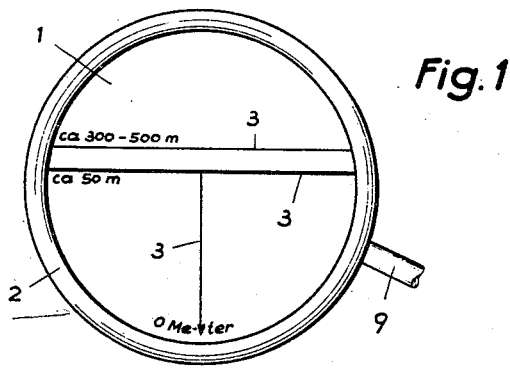
Figure 1 shows in plan view a round flat mirror constructed in accordance with the principles of the present invention.

Figure 1 shows a mirror 1 enclosed in a frame 2 and provided with lines 3 constituting indicia for determining the location of the overtaking car. These indicia may consist of a horizontal top line indicating a distance range of 300 to 500 meters, a lower line parallel thereto indicating the distance of 50 meters which constitutes the danger zone and an additional third line extending perpendicularly to the lower edge of the mirror.

Figure 2:
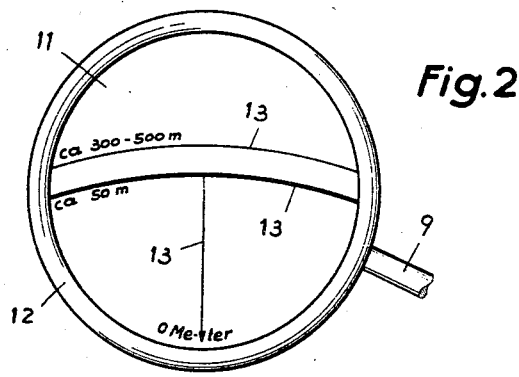
Figure 2 is a plan view of a spherically curved mirror.

Figure 2 shows a similarly constructed rear view mirror 11 which however, is spherical in shape. The mirror 11 has a frame 12 and three indicating lines 13 similar to those illustrated in Figure 1. The mirror is attached to the frame of the automobile by a rod 9.

Figure 3:
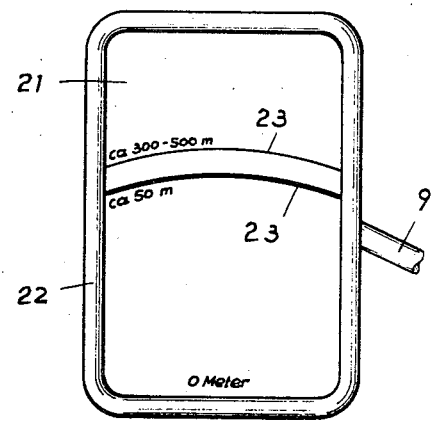
Figure 3 is a plan view of a rectangular mirror having a cylindrical curvature.

Figure 3 shows a mirror 21 having a cylindrical curvature and provided with a rectangular frame 22. The mirror is provided with indicia 23 and a connecting rod 9, which are similar to those previously described.

Figures 4 and 5 show a round mirror 31 having a frame 32 and provided with indicia 33 as well as a connecting rod 9. This mirror 31 is provided with a line indicator 4 having an end 5 which extends beyond the edge of the mirror frame 32. The end 5 may constitute a continuation of the line indicating the distance of 100 meters. Preferably, the line indicator 4, 5 consists of a wire the thickness of which is substantially the same as the width of the indicating line. As shown in Figure 5, this wire has two rectangular portions. One end of the wire is attached to the rear surface of the mirror over an indicating line by soldering or the like, while the other end 5 extends parallel to the soldered end at a distance of three to four centimeters therefrom. The end 5 extends beyond the frame 32 of the mirror and is in alignment with its indicating line 3 when the direction of vision is perpendicular to the surface of the mirror.

Obviously, the line indicator 4, 5 may be replaced by a metal strip (not shown) provided with a viewing slit which extends in alignment with the indicating line to which it belongs.

Figure 6 illustrates a mirror 41 having frame 42 which is provided with three different sections 6, 7 and 8 having different reflecting powers. The section 6 represents the danger zone and has the greatest reflecting power, namely, it reflects all light falling thereon. The section 7 located above the section 6 may be lightly colored, and it reflects more light than the lower section 8 which may be of a darker color. As already stated, these variations in reflecting power will greatly facilitate the use of the mirror which is attached to the car by the connecting rod 9. A line indicator 5 is attached to the rear surface of the mirror and extends in alinement with the 20 meter line.

It is apparent that the examples shown above have been given solely by way of illustration and not by way of limitation and that they are subject to many variations and modifications without exceeding the scope of the present invention. All these variations and modifications are to be included within the scope of the present invention.

What is claimed is:

1. A rear view mirror for drivers of vehicles, said mirror comprising a single continuous reflecting surface having two transverse spaced lines upon the mirror extending across said surface and corresponding to different road distances of an object reflected in said surface from the mirror, whereby said two lines divide said surface into three strip-like substantially horizontal superposed sections, whereby an image of an overtaking vehicle moves uninterruptedly from one section to another section of the single reflecting surface, the central section representing the greatest danger zone for the driver who is being overtaken by an oncoming vehicle, each of said sections having a different reflecting power and producing images of different light intensity from the other two sections, the central section representing the warning zone and having the greatest reflecting power to produce the brightest images, while the uppermost and lowermost sections have lesser reflecting power.

2. A rear view mirror in accordance with claim 1, wherein the reflective power of said sections is varied by coloring of varying intensity.

References Cited in the file of this patent

UNITED STATES PATENTS

| 1,311,253 | Stern | July 29, 1919 |
| 1,879,592 | Thomas | Sept. 27, 1932 |
| 2,161,457 | Critchlow | June 6, 1939 |
| 2,374,956 | Rubissow | May 1, 1945 |
| 2,514,989 | Buren | July 11, 1950 |